(12) United States Patent  
Friedrich et al.

(10) Patent No.: US 8,274,370 B2  
(45) Date of Patent: Sep. 25, 2012

(54) MODULATOR AND MODULATION METHOD FOR A WIRELESS DATA TRANSMISSION DEVICE

(75) Inventors: Ulrich Friedrich, Ellhofen (DE); Martin Fischer, Pfedelbach (DE); Michael Pangels, Ludwigsburg (DE)

(73) Assignee: Atmel Corporation, San Jose, CA (US)

( * ) Notice: Subject to any disclaimer, the term of this patent is extended or adjusted under 35 U.S.C. 154(b) by 1248 days.

(21) Appl. No.: 11/652,563

(22) Filed: Jan. 12, 2007

(65) Prior Publication Data

US 2007/0109102 A1    May 17, 2007

Related U.S. Application Data

(63) Continuation of application No. PCT/EP2005/007496, filed on Jul. 11, 2005.

(30) Foreign Application Priority Data

Jul. 12, 2004  (DE) .................. 10 2004 033 782

(51) Int. Cl.  
*H04Q 5/22* (2006.01)

(52) U.S. Cl. .................................. 340/10.4

(58) Field of Classification Search ........... 340/10.1, 340/825.2, 10.2, 10.4, 10.5, 10.3, 505  
See application file for complete search history.

(56) References Cited

U.S. PATENT DOCUMENTS

| | | | | |
|---|---|---|---|---|
| 4,040,053 A | * | 8/1977 | Olsson | 342/42 |
| 4,833,588 A | * | 5/1989 | Schauder | 363/159 |
| 6,703,921 B1 | | 3/2004 | Wuidart et al. | |
| 6,870,460 B2 | | 3/2005 | Turner et al. | |
| 7,053,854 B2 | * | 5/2006 | Plettner et al. | 343/841 |
| 7,151,436 B2 | | 12/2006 | Fischer et al. | |
| 7,215,976 B2 | * | 5/2007 | Brideglall | 455/552.1 |
| 7,221,259 B2 | * | 5/2007 | Cole | 340/10.2 |
| 7,260,371 B1 | * | 8/2007 | Yones | 455/186.1 |

FOREIGN PATENT DOCUMENTS

| | | |
|---|---|---|
| DE | 198 00 565 A1 | 7/1999 |
| DE | 101 58 442 A1 | 6/2003 |
| DE | 103 01 451 A1 | 7/2004 |
| EP | 1 211 635 A2 | 6/2002 |

OTHER PUBLICATIONS

Office Action and English translation for Chinese Patent Application 200580022875, Mar. 11, 2011.

* cited by examiner

*Primary Examiner* — Vernal Brown  
(74) *Attorney, Agent, or Firm* — Baker Botts L.L.P.

(57) ABSTRACT

In certain embodiments, an apparatus includes a rectifier and a switch. The rectifier is configured to modulate a received carrier signal. The switch is coupled to at least one node of the rectifier. The switch is configured to modify an impedance of the rectifier to modulate the received carrier signal by providing a potential to the at least one node of the rectifier based on a field strength of the received carrier signal and a modulation-control signal.

23 Claims, 3 Drawing Sheets

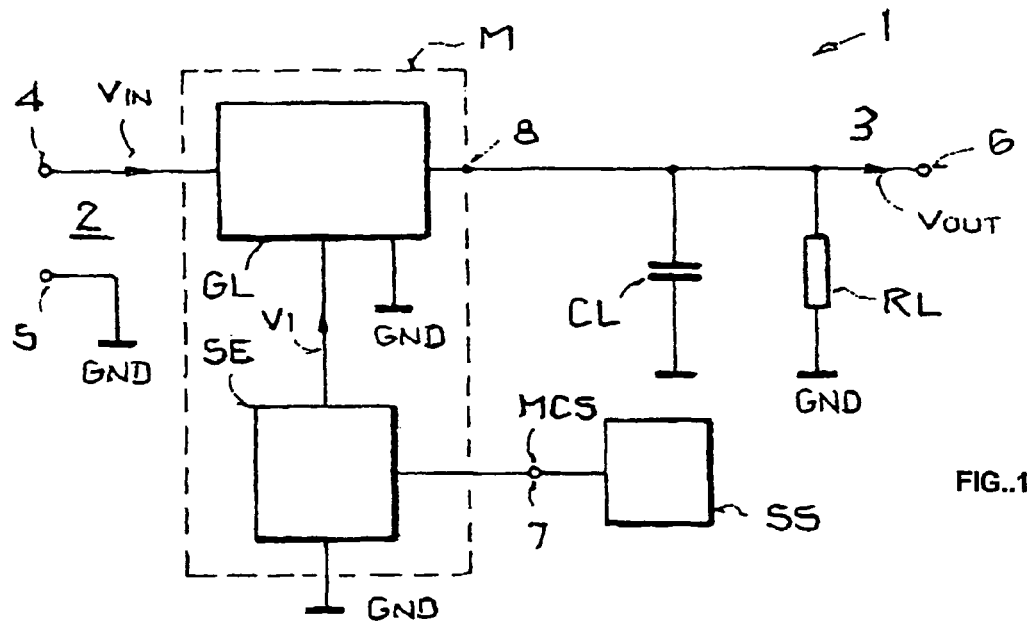
FIG..1
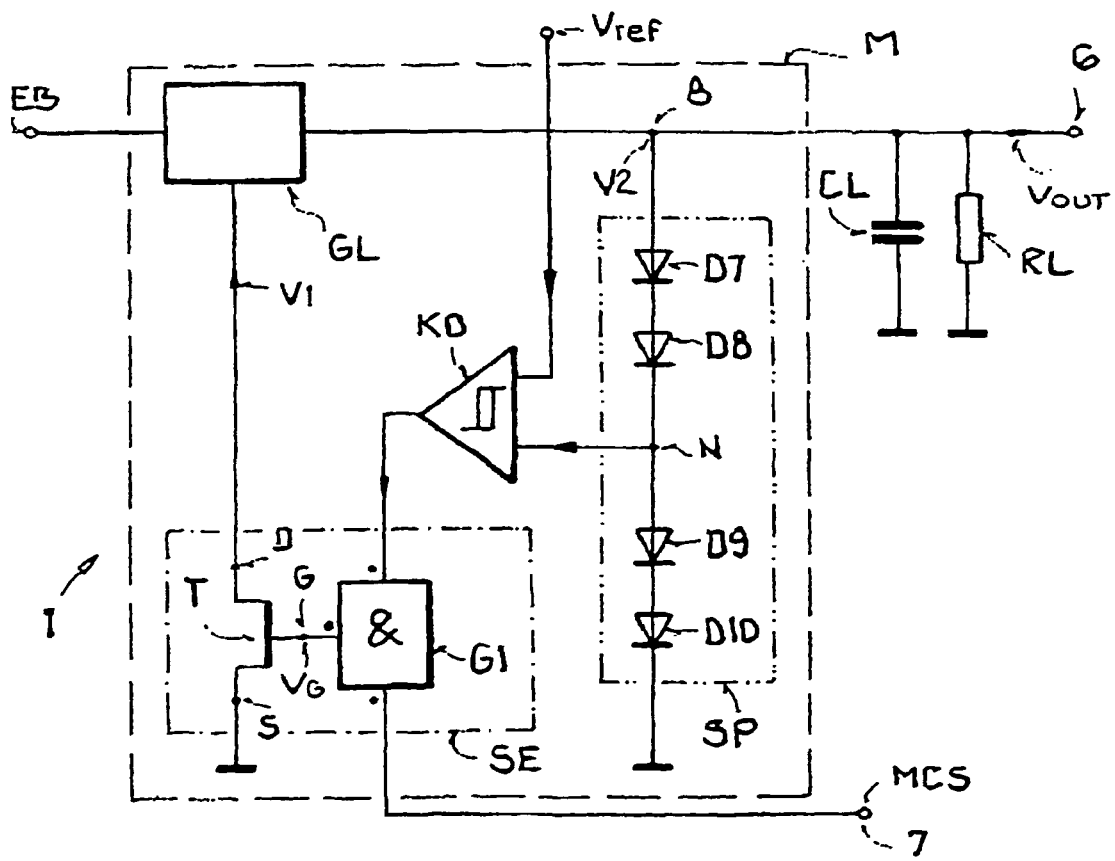
FIG..2

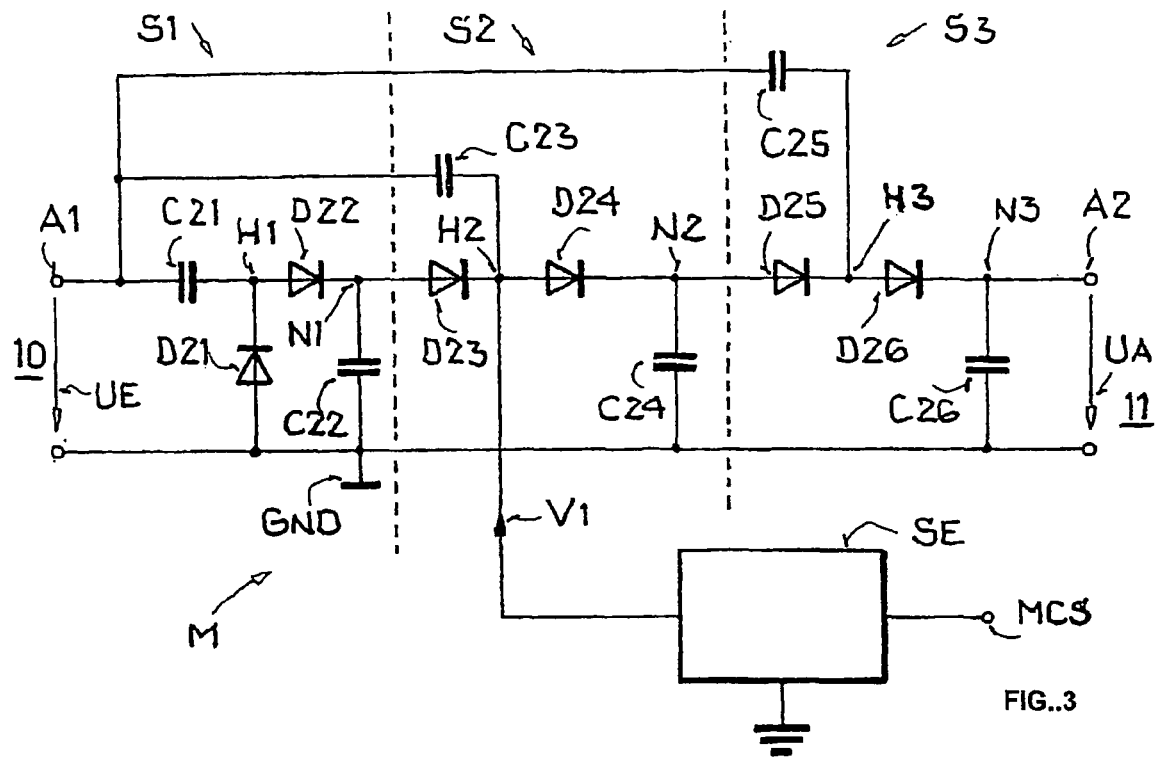
FIG..3
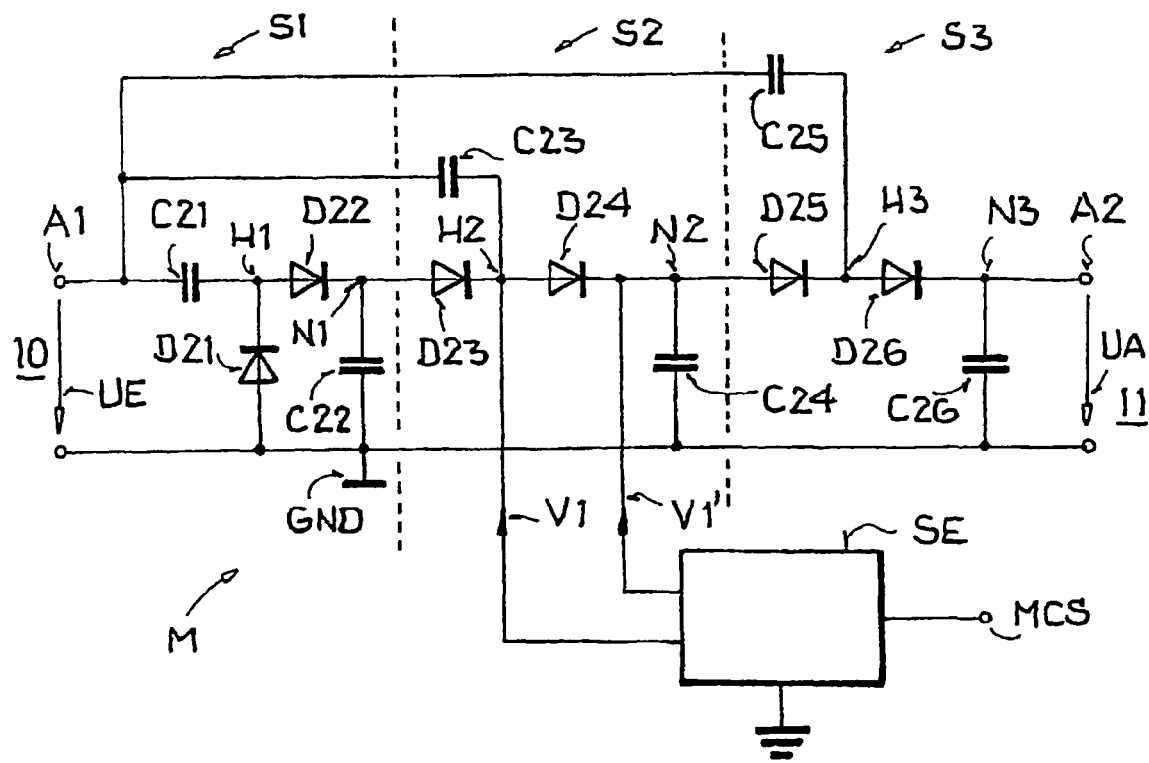
FIG..4

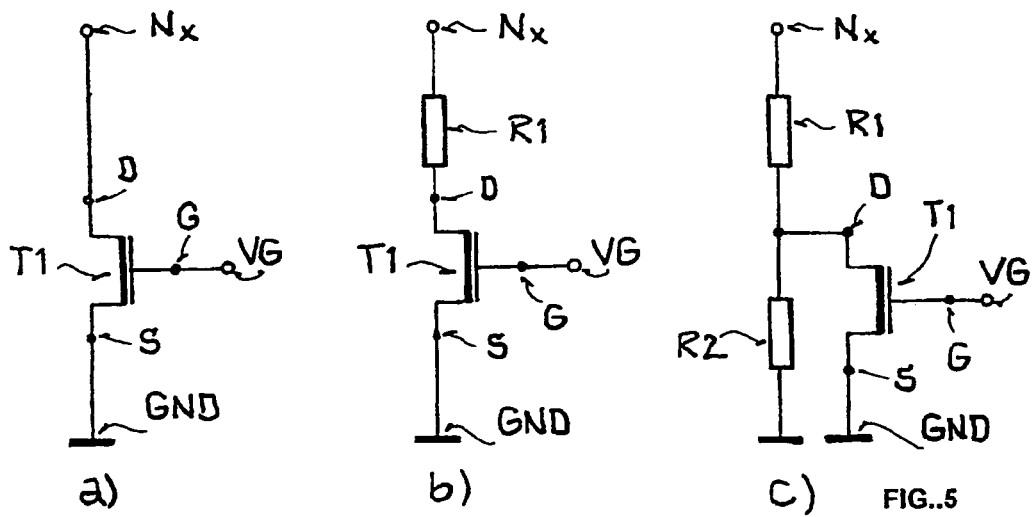
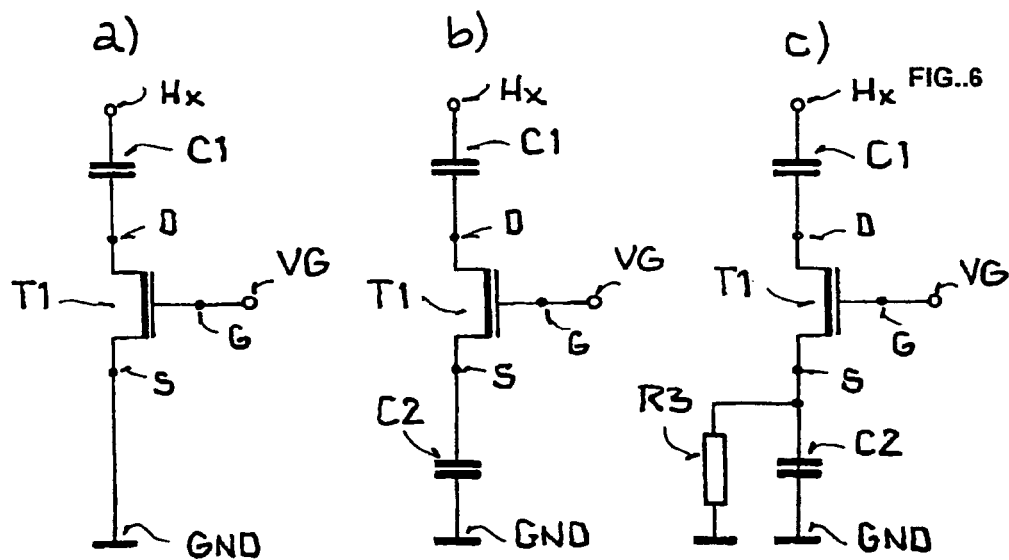
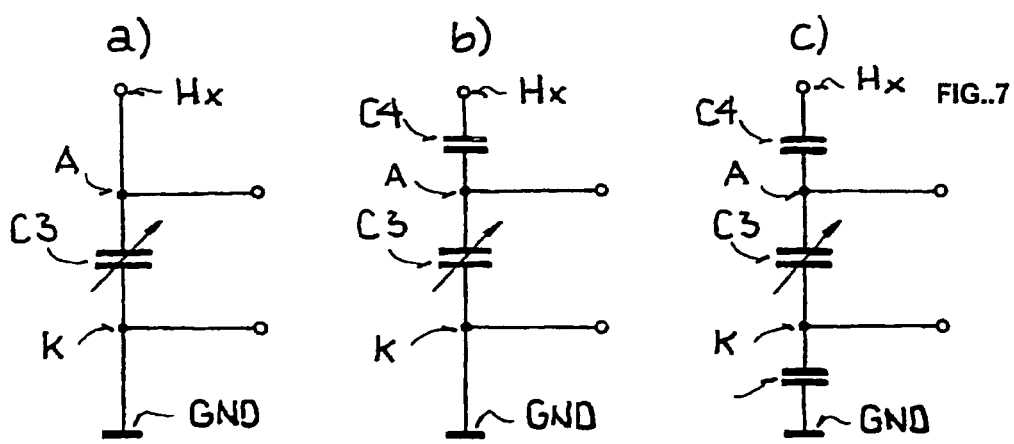
FIG. 5
FIG. 6
FIG. 7

MODULATOR AND MODULATION METHOD FOR A WIRELESS DATA TRANSMISSION DEVICE

This nonprovisional application is a continuation of International Application PCT/EP2005/007496, which was filed on Jul. 11, 2005, and which claims priority to German Patent Application No. DE 102004033782, which was filed on Jul. 12, 2004, and which are all herein incorporated by reference.

BACKGROUND OF THE INVENTION

1. Field of the Invention

The present invention relates to a modulator for data transmission between a transponder and a base station, which amplitude modulates and/or phase modulates a received electromagnetic carrier signal as a function of data to be transmitted. The invention further relates to a transponder having such a modulator, and a modulation method for operating such a modulator.

2. Description of the Background Art

The invention resides in the field of transponder technology and more particularly in the field of contactless communication for the purposes of identification. Although applicable in principle to any desired communication systems, and thus to any desired modulation devices, the present invention and the problems it was designed to solve are explained below with respect to so-called RFID communication systems, and in particular to RFID modulation devices and their applications. In this context, RFID stands for "Radio Frequency Identification." In RFID systems, data are transmitted wirelessly between one or more base stations (or writing/reading devices) and one or more transponders. For general background on such RFID technology, please refer to "RFID Handbuch" by Klaus Finkenzeller, Hanser Verlag, third revised edition, 2002.

Passive transponders have no independent energy supply, while semi-passive transponders have their own energy supply, but neither active nor semi-passive transponders have an active transmitter for data transmission to the base station. In passive and semi-passive RFID systems of this nature, the backscatter technique is generally used for data transmission—especially at distances of significantly more than one meter—in conjunction with UHF or microwaves. In the backscatter technique, the backscatter cross-section of the antenna is used for return data transmission from the transponder to the base station. To this end, modulated electromagnetic carrier signals are transmitted by the base station, and are received and demodulated by a transmitting and receiving device in the transponder. In addition, the electromagnetic carrier signals are modulated by the transponder with a customary modulation method as a function of the data to be transmitted to the base station and are reflected. In general, this is accomplished by a change in the input impedance of the transponder's transmitting and receiving device, which causes a change in the reflection properties of an antenna connected thereto. In addition to amplitude modulation (ASK), methods used for modulation in modern communications systems increasingly also use phase modulation (PSK) and frequency modulation (FSK) in conjunction with pulse-width modulation. Various methods are known for this purpose.

In a first type of modulation method, which is described in European patent application EP 1 211 635 A2, which corresponds to U.S. Pat. No. 6,870,460, the real component of the input impedance is changed by connecting and disconnecting an essentially ohmic, and hence resistive, load, which primarily achieves an amplitude change or amplitude modulation of the reflected waves. This modulation method is called amplitude shift keying (ASK). The ohmic load here loads the voltage supply of the transponder as an additional consumer; as a result, the maximum distance that can be spanned between the transponder and base station is significantly reduced, especially for passive transponders without their own energy supply. ASK modulation is thus especially suitable for short distances between the base station and transponder, but is only usable to a limited extent for greater distances.

In a second type of modulation method, the imaginary component of the input impedance is influenced by changing the capacitance of a capacitor in the input section of the transmitting and receiving device, primarily achieving a phase change or phase modulation of the reflected waves. This modulation method is called phase shift keying (PSK). A method of this nature is disclosed in the applicant's German patent application DE 101 58 442 A1, for example. In comparison to ASK modulation, PSK modulation has almost no effect on the operating voltage, with the result that a higher efficiency is achievable for the transponder and the maximum spannable distance between the transponder and base station increases. However, the power reflected by the transponder may decrease when the distance between the transponder and base station is reduced. At very small distances, the situation can arise that the base station can no longer detect the phase modulated signal reflected by the transponder. Thus, PSK modulation may not be optimal for very short distances between the base station and the transponder.

The need thus exists to be able to operate an RFID system in both the near field region, which is to say at relatively short distances between transponder and base station, and the far field region, which is to say at relatively long distances between transponder and base station. Please refer to the aforementioned RFID Handbuch by Klaus Finkenzeller for definitions of near field and far field regions.

In prior art modulators in RFID communications systems, a switching unit intervenes either before the rectifier (in the case of ASK and PSK modulation) or after the rectifier (in the case of ASK modulation as load modulation). In German patent application DE 103 01 451, which corresponds to U.S. Pat. No. 7,151,436, which is herein incorporated by reference, a method is described in which a multi-stage rectifier arrangement is provided and the modulator intervenes at a shared node located between adjacent stages of the rectifier. In this context, the arrangement achieves an amplitude modulation in that modulation of the carrier wave transmitted back (returned) to the base station is accomplished by a switching means connected to the rectifier. To this end, a modulation control signal is supplied to the switching means. This solution places a considerable load on the switching unit of this DC node, and in particular can only be used with passive, especially backscatter-based, transponder systems when high energy absorption by the transponder from the electromagnetic field is possible in the near field, i.e. at very short distances.

SUMMARY OF THE INVENTION

It is therefore an object of the present invention to provide, for wireless data communication, modulation that is efficient and as reliable as possible, wherein modulation of the returned carrier wave is accomplished by means of a rectifier.

Accordingly, provision is made to provide a modulator for data transmission between a transponder and a base station, which phase modulates and/or amplitude modulates a received electromagnetic carrier signal in a transponder as a function of data to be transmitted, which includes a rectifier circuit for rectifying the received electromagnetic carrier signal having at least one rectifier stage with at least one circuit node, and in which the circuit node is connected by a capacitive coupling to an input of the rectifier circuit, and of a switching device whose output side intervenes in at least one rectifier stage of the rectifier circuit, in that at least one circuit node of this rectifier stage is connected to the switching device, and further includes a modulation control device that provides a modulation control signal for a control input of the switching device.

A transponder is also provided for wireless data communication with a base station, having a transmitting and receiving device for receiving received electromagnetic carrier signals and for transmitting modulated data, having at least one inventive modulator that, within the rectifier circuit, phase modulates and/or amplitude modulates the data to be transmitted.

A method for data transmission is also provided between a transponder and a base station, wherein, in a transponder, a received electromagnetic carrier signal is returned phase-modulated as a function of data to be transmitted, and a modulation control signal is generated by means of a modulation control device, wherein the modulation control signal is supplied to a rectifier and the modulation is accomplished by the rectifier alone.

In an embodiment, at least one AC node of at least one rectifier stage is connected to a controllable switching device. The AC node has a capacitive coupling to the antenna input of the transponder, which is to say in the case of the HF carrier signal that the AC node is directly connected to the input of the transponder. The controllable switching device, which is driven by a drive signal, is designed specifically to connect this AC node to a voltage, for example a reference voltage, and thereby change the input impedance of the rectifier or of the transponder. This makes possible efficient phase modulation in which the parasitic properties of the components of the modulation device have no effect on the input side in the high frequency range or in the low frequency range. At the same time, a capacitor that may be used for smoothing the output voltage of the rectifier circuit is loaded only insignificantly by switching processes in conjunction with the modulation. Alternatively, or in addition, provision can also be made that the controllable switching device also intervenes in at least one DC node within the rectifier circuit and/or in an output node of the rectifier circuit for load modulation. This is especially advantageous when a great deal of energy is absorbed from the electromagnetic field of the base station in the near field and the modulation is to be accomplished by means of the rectifier alone. Alternatively, however, the amplitude modulation may also be carried out in another switching unit that is connected separately to the antenna input of the transponder, rather than in the rectifier.

The advantage of the intervention in the AC node and DC node is that discharging of the support capacitor at the output of the rectifier circuit is automatically prevented by the inventive modified modulator in that a following diode is polarized in the reverse direction as soon as the voltage in the rectifier stage acted on by the modulation becomes lower. In addition, investigations by the applicant have shown that the efficiency of intervention by the controllable switching device in an AC node is even higher than when it intervenes in a DC node of the rectifier circuit. The inventive modulation is thus especially advantageous for PSK modulation, in particular when only small amounts of energy are available for the transponder in the far field by means of the rectifier.

Furthermore, the inventive modulation additionally offers a very reliable modulation that is also very flexible in combination with ASK modulation, since an efficient modulation is provided here for both ASK modulation and PSK modulation.

In an embodiment, a voltage sensor is connected to an output of the rectifier and to an input of the controllable switching device. In this way, it is possible for an evaluation unit, for example an AND gate, to accomplish a connection between the magnitude of the applied output voltage of the rectifier and the modulation control signal as a function of the magnitude of the output voltage of the rectifier. By this means, the switchover threshold of the gate can be used to provide a first voltage threshold in order to effectively suppress modulation within the rectifier when a minimum voltage is not provided by the voltage sensor or the modulation control signal.

In another embodiment, a comparator, which preferably is designed as a Schmitt trigger, is provided between the voltage sensor and the evaluation unit. In this regard, a reference connection can be applied to an input of the comparator, by which means a voltage threshold is predefined. By means of the voltage threshold, the rectifier can be subjected to an amplitude modulation in addition to or alternatively to a phase modulation. Depending on the design of the evaluation unit, for example as an OR operation, cascading of the modulation type can be achieved in that preferably a phase modulation is switched on above a first voltage threshold and amplitude modulation is additionally switched on above a higher second voltage threshold.

In another further embodiment, the modulation index can also be changed by means of the voltage sensor as a function of the output voltage of the rectifier. In this context, the degree of the modulation is increased to a maximum of 100% in the case of an amplitude modulation, provided the output voltage of the rectifier is sufficiently high.

In another embodiment, at least one rectifier stage has a first node with a high HF voltage and, following the first node, a second node with a second, lower HF voltage than the first node.

In a further embodiment, the controllable switching device is connected on the output side to at least one first node of the rectifier circuit. In addition or alternatively, in a second further embodiment, the controllable switching device can also be connected on the output side to at least one second node of the rectifier circuit.

In an embodiment, the rectifier circuit is designed in the form of a single-stage rectifier. In this case, the controllable switching device is connected on the output side to the first node of the only rectifier stage of the single-stage rectifier.

In an alternative embodiment, the rectifier circuit is designed as a multi-stage rectifier. Here, the controllable switching device preferably, although not necessarily, intervenes in at least two of the rectifier stages.

In an embodiment, the controllable switching device can have at least one controllable switch whose control connection can be driven through a control signal and whose controlled path can thus be switched in and out by means of the control signal. Preferably in this context, the controllable switch is designed as a transistor, in particular as a MOSFET, and most particularly as a CMOS-MOSFET. Alternatively, a transistor in the form of a bipolar transistor, JFET, thyristor, IGBT, etc., may also be provided here.

In addition or alternatively, however, the controllable switch can also be designed as a varactor, especially as a MOS varactor.

In an embodiment, at least one capacitive element, in particular a capacitor, is arranged in series with the controlled path of the controllable switch. A suitably wired transistor may also be used as a capacitive element. The capacitive element here may be located on the reference potential side as well as additionally or alternatively on the output side with respect to the rectifier circuit. The output of the controllable switch can be coupled to the first node through the capacitive element.

In another advantageous embodiment, at least one resistive element, in particular a resistor, is arranged in parallel with the controlled path of the controllable switch. A transistor may also be used as the resistive element. The resistive element here may be located on the reference potential side as well as additionally or alternatively on the output side with respect to the rectifier circuit. The output of the controllable switch can be coupled to the second node through the resistive element.

In an embodiment, the modulator is designed as a phase modulator for influencing the electrical characteristics of a transmitting and receiving device. In addition or alternatively thereto, the modulator may also be designed as an amplitude modulator for amplitude keying and/or for influencing a load on the transmitting and receiving device in such a manner that the electromagnetic carrier signal can be modulated with a data signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 illustrates a block diagram of a receiving device having a modulator, according to an embodiment of the present invention;

FIG. 2 illustrates a block diagram of a transmitting/receiving device according to another embodiment of the present invention;

FIG. 3 illustrates a first embodiment of the inventive modulator;

FIG. 4 illustrates a second embodiment of the inventive modulator;

FIG. 5a-c show first designs of the controllable switching device as transistor with resistors;

FIG. 6a-c show second designs of the controllable switching device as transistor with capacitors;

FIG. 7a-c show third designs of the controllable switching device as varactor with capacitors.

DETAILED DESCRIPTION

In the drawings, like or functionally like elements and signals are identified with the same reference labels, unless otherwise specified.

FIG. 1 uses a block diagram to depict a first, general arrangement with an inventive modulator, showing a transmitting and receiving device, labeled with reference symbol 1, for a passive or semi-passive transponder whose purpose is bidirectional communication with a base station which is not shown in FIG. 1.

The transmitting and receiving device 1 has an input 2 and an output 3. The input 2 has a first and a second input connection 4, 5, wherein an input voltage VIN is applied to the first input connection 4 and a reference voltage, for example the reference ground potential GND, is applied to the second input connection 5. The input voltage VIN is, for example, the electromagnetic carrier signal transmitted by a base station and received by the transponder or a signal derived therefrom. At the output 3, an output connection 6 is provided, where an output signal VOUT can be obtained.

Provided between the input 2 and the output 3 is an inventive modulator M. The modulator M has a rectifier GL, which can be single stage or multi-stage in design. The modulator M additionally has a controllable switching device SE, which is connected to the rectifier GL and which applies a control voltage V1 to a node within the rectifier GL, as explained in detail further below. Furthermore, the controllable switching device SE has a control connection 7, into which a modulation control signal MCS can be coupled. The modulation control signal MCS is produced by a control circuit SS in accordance with the invention. The controllable switching device SE and rectifier GL are each connected to a reference voltage GND.

A capacitive load CL and an ohmic load RL, which are arranged in a parallel circuit between the output 8 of the rectifier GL and the output 3, represent the respective load components of subsequent circuit components of the transponder, which are of no further interest here and are thus not shown in detail, wherein the capacitive load CL primarily serves to smooth the output voltage of the rectifier GL.

The base station emits electromagnetic waves, for example in the UHF range, which are received by the antenna. Part of the power of the electromagnetic waves serves to supply electric power to the transponder; the other part is modulated and reflected as a function of data to be transmitted to the base station. The alternating current signal present at the input 2 between the input connections 4, 5, which is taken from the base station's carrier field by means of absorption, is rectified by the rectifier GL.

With regard to the different structure and mode of operation of a modulator for phase shift keying and for amplitude shift keying in general, reference is made to the German patent application with file number DE 103 01 451, which, as noted above, corresponds to U.S. Pat. No. 7,151,436.

FIG. 2 shows a transmitting and receiving device 1 in which a diode path is used to generate a reference voltage that serves to enable the phase shift keying and/or amplitude shift keying. The modulator M includes a voltage sensor SP, which is designed as series-connected diodes D7-D10. The diodes D7-D10 are located between the output 8 of the rectifier GL and the reference potential GND in the forward direction. The output of the voltage sensor SP that is connected within the voltage sensor to the node N of the diode path is connected to an input of a comparator KO. In addition, the comparator KO, which is designed as a Schmitt trigger, has another input at which a reference voltage Vref is present. The output of the comparator is connected within the control unit SE to an evaluation unit BE, which, as an AND gate, performs a combination with the modulation control signal MCS, which is likewise present at the control device. The controllable switching device SE also has a MOS transistor T, which has one of the terminals of its drain-source channel (controlled path) connected to the supply voltage and has the other terminal of its drain-source channel connected to the reference potential GND. In addition, the control input G of the MOS transistor T is connected to the output of the evaluation unit.

The reference voltage Vref present at the node N serves as an enable signal for phase modulation and/or amplitude modulation in conjunction with the voltage source Vref of the comparator KO and the connection through the evaluation unit G1. When the output voltage V2 at the output 8 of the rectifier GL is not sufficient to make the diode path D7-D10 conduct, then a very low voltage, corresponding to the reference potential GND or a logic zero, is present at the input of the comparator KO that is connected to the node N. The output of the comparator KO is thus also at "0," and remains in this state until the voltage present at the node exceeds the reference voltage Vref, which is to say the transistor T is in the blocking, which is to say switched off, state. The modulation device M thus remains inactive despite being driven by the modulation control signal MCS as long as an AND combination is provided in the evaluation unit. Enabling, which is to say activation of the modulation device M, does not occur in this case until there is a sufficient voltage level V2 at the output 8 of the rectifier GL, which is not present until the field strength is suitably high. When a sufficient voltage level is present for activation, the output signal of the evaluation unit BE then corresponds to the modulation control signal MCS, causing the transistor T to be switched on and off synchronously with the modulation control signal MCS.

FIG. 3 shows a first example embodiment of the inventive modulator M. FIG. 3 shows a circuit diagram of a rectifier GL with modulation intervention, designed as a voltage multiplier circuit. The voltage multiplier circuit GL is constructed here, strictly as an example, from three stages S1-S3, where the individual rectifier stages S1-S3 are arranged in series between an input 10 and an output 11 of the voltage multiplier circuit GL. It is a matter of course that the voltage multiplier circuit GL can also have more or fewer than three stages, with the number of stages Sx being chosen as a function of the desired output voltage. The input voltage UE of the voltage multiplier circuit GL is applied between an input voltage connection A1 and a ground potential GND. The output voltage UA can be tapped at an output terminal A2. An output or output node of a preceding stage Sx of the voltage multiplier circuit GL is, as described further below, coupled in each case to an input or input node of the following stage Sx.

The first stage S1 comprises two capacitors C21, C22 and two diodes D21, D22. One terminal of capacitor C21 is connected to the input connection A1, and the other terminal is connected via a first node H1 to the cathode of diode D21 and the anode of diode D22. This first node H1 forms a high-frequency node H1, also called an AC node. The anode of diode D21 and one terminal of capacitor C22 are connected to the reference potential GND. The other terminal of capacitor C22 and the cathode of diode D22 are connected to one another through a second node N1, and form the output of the first stage S1 together with the reference potential GND. The output of the first stage S1 forms a node that has a low frequency relative to the first node H1 and is called a DC node N1. The second node N1 simultaneously forms the input node of the following stage S2.

The second stage S2 comprises two capacitors C23, C24 and two diodes D23, D24. The anode of diode D23 is connected to an output terminal N1 of the first stage S1. Diodes D23, D24 are connected in series in the forward direction between the input node N1 and the second node N2 of the second stage S2, which functions as an output node. A capacitor C24 is connected between the output node N2 and the reference potential GND. The first stage S1 is also coupled to the second stage S2 through capacitor C23, which has one terminal connected to the input connection A1 and has its other terminal connected to a tap between the series connection of diodes D23, D24, and is thus connected to the first node H2 of the second stage S2.

The third stage S3 comprises two capacitors C25, C26 and two diodes D25, D26. These are wired in the same way as in the second stage S2. The second node N3 of the third stage S3 simultaneously forms the output terminal A2 of the voltage multiplier circuit GL.

In the example in FIG. 3, the first node H2 of the second stage S2 is connected to a controllable switching device SE, for example to an output of a transistor T from FIG. 2, for phase shift keying. The controllable switching device SE connects this node H2 synchronously to the reference potential GND under the control of a drive signal, for example the modulation control signal MCS. This effects a phase shift keying of the reflected waves. The advantage of such an intervention is obvious. As a result of the intervention of the controllable switching device SE within a stage S2 of a multi-stage rectifier GL in comparison to a switched load before or after the rectifier, [the advantage] is that the following capacitive load CL and resistive load RL are not additionally loaded by the switching process.

FIG. 4 shows a second example embodiment of the inventive modulator. Here, in contrast to FIG. 3, the output side of the controllable switching device SE also intervenes in the output of the second stage S2, hence in the second node N2 of the second stage S2. In the example in FIG. 4, amplitude modulation is thus performed as well as phase modulation, in that the second node N2 of the second stage S2 is supplied with the reference potential GND through the controllable switching device SE. In this process, the controllable switching device SE connects this node N2 synchronously to the reference potential GND under the control of the modulation control signal MCS, additionally or alternatively effecting an amplitude modulation of the reflected waves.

In this context the two operating modes, which is to say the amplitude shift keying and the phase shift keying, can be performed at the same time or separately from one another depending on the application. It is also conceivable for the controllable switching device SE not to be embodied as one device, instead providing several of these devices, one for each operating mode (ASK, PSK), or one for each intervention in the rectifier circuit GL.

In place of the stages S1-S3 shown, stages in a Delon/Greinacher circuit, one stage in a Villard circuit, or the like can also be used, wherein at least one high-frequency HF node Hx, and preferably also a low-frequency LF node Nx, are connected to a reference potential GND under the control of a controllable switching device SE.

As is clear from the above description of some example embodiments, the invention provides a method and associated circuit arrangements that permit reliable data transmission between a base station and a passive transponder across a wide range of distances, extending from relatively short distances to relatively long distances. The circuit arrangements can be integrated into the various transponder designs in a very simple manner.

FIGS. 5 and 6 show first and second embodiments of the controllable switching device SE with resistors and capacitors. In FIGS. 5 and 6, the controllable switching devices SE each contain one transistor T1. In this regard, the transistor T1 can be the transistor T from FIG. 2 or else a switching means that is different therefrom. The transistor T1 has a control terminal G into which the modulation control signal MCS or a signal derived therefrom can be coupled, for example. The controlled path of the transistor T1, formed in the case of a MOSFET transistor by its gate-source path or gate-source channel, can be switched on and off through the control terminal G with a control signal VG. The control signal VG in this context can be a signal derived from the modulation control signal.

In FIG. 5, the controllable switching device SE is designed for a continuous-time DC application. In FIG. 5(a), the controlled path of the transistor T1 is located directly between the reference potential GND and one of the two LF nodes Nx. In FIG. 5(b), a first resistor R1 is located between the output terminal D of the transistor T1 and the LF node Nx. In FIG. 5(c), another resistor R2 is additionally located in parallel with the controlled path of the transistor T1. In the switched-on state of the transistor T1, such a controllable switching device SE provides an additional DC current consumption in the rectifier GL, and thus provides an altered impedance, wherein essentially the real part of the transponder impedance is changed.

In FIG. 6, the controllable switching device SE is designed for a discrete-time AC application. In FIG. 6(a) a first capacitor C1 is located between the output terminal D of the transistor T1 and the HF node Hx. FIG. 6(a) thus shows a switchable capacitor that has the function of a resistor in the discrete-time domain. In FIG. 6(b), another capacitor C2 is additionally located between the reference potential connection S of the transistor T1 and the reference potential GND. In FIG. 6(c), a resistor R3 is additionally arranged in parallel with the additional capacitor C2, which is to say between the reference potential connection S of the transistor T1 and the reference potential GND. In the switched-on state of the transistor T1, such a controllable switching device SE provides an additional AC power consumption in the rectifier GL, and thus provides an altered impedance, because the phase angle between current and voltage becomes larger. In changing the impedance, the real part and the imaginary part of the transponder impedance are changed. In this case, one can also speak of an additional damping, or alternatively of the connection of a capacitor with a Q value that is very low, and thus poor, with a high, loss-encumbered series resistance. Essentially the imaginary part of the transponder impedance is changed here.

In FIG. 7, the controllable switching device SE contains a varactor C3. A varactor C3 is a voltage-controlled capacitor, hence one with control terminals by means of which the capacitance of the varactor C3 can be controlled and thus set. To this end, the capacitor terminals A, K of the varactor C3 are each connected to an output of a control unit—not shown—that intentionally changes the capacitance of the varactor C3, for example as a function of the modulation control signal.

In FIG. 7(a) the varactor C3 is located directly between the reference potential GND and the NF node Hx. In FIG. 7(b) a first capacitor C4 is located between the output terminal A of the varactor C3 and the HF node Hx. In FIG. 7(c) another capacitor C5 is additionally located between the reference voltage terminal K of the varactor C3 and the reference potential GND. A controllable switching device SE of this type likewise changes essentially the imaginary part of the transponder impedance.

Although the present invention has been described on the basis of a preferred example embodiment, it is not limited thereto, but instead can be modified in a variety of ways.

Thus, as already mentioned above, the rectifier circuit in particular is not limited to the circuit design of FIGS. 3 and 4, but instead can be designed in any different manner desired, for example as a single stage or multiple stages.

The embodiment of the controllable switching device SE is also to be understood as merely an example. Naturally, any desired different and expanded designs and embodiments can also be used, for example by providing additional resistors and/or capacitors connected in series and/or parallel with the controlled path of the switch or varactor on the output side and/or the reference potential side. In particular, a combination of the arrangements described is also possible.

In particular, the invention is also not limited exclusively to RFID systems, but instead can, of course, be expanded, for example to item identification. It is frequently not necessary to uniquely identify individual parts. It is generally sufficient here to be able to rule out the presence of a defective part, for example. This is generally referred to as non-unique identification. When the transponder is used in this context, it has the function of a remote sensor. Thus, the invention expressly relates to such sensors, wherein communication is performed to read and write data of a data media or sensor. As an example of such a remote sensor application, reference can be made to a temperature sensor, a pressure sensor, or the like.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus comprising:
   a rectifier configured to modulate a received carrier signal; and
   a switch coupled to at least one node of the rectifier, the switch being configured to modify an impedance of the rectifier to modulate the received carrier signal by providing a potential to the at least one node of the rectifier based on a field strength of the received carrier signal and
   a modulation-control signal.

2. The apparatus of claim 1, wherein the potential provided to the at least one node of the rectifier is a reference potential.

3. The apparatus of claim 1, further comprising a voltage sensor configured to provide a voltage based on the field strength of the received carrier signal, the voltage sensor being coupled between the switch the rectifier.

4. The apparatus of claim 3, further comprising an evaluation unit configured to control the providing of the potential to the at least one node of the rectifier based on the modulation-control signal and the voltage based on the field strength of the received carrier signal.

5. The apparatus of claim 3, further comprising a comparator configured to provide a signal when the voltage based on the field strength of the received carrier signal is higher than a reference voltage.

6. The apparatus of claim 1, wherein the at least one node of the rectifier is a high frequency node such that providing the potential to the high-frequency node performs phase modulation of the received carrier signal.

7. The apparatus of claim 1, wherein the rectifier is further configured to return the modulated received carrier signal to a base station.

8. The of claim 1, wherein the switch is one of a transistor, a metal-oxide-semiconductor field-effect transistor (MOSFET), a varactor, or a metal-oxide-semiconductor (MOS) varactor.

9. An apparatus comprising:
   means for receiving a carrier signal from a base station;
   means for modulating the received carrier signal; and
   means for modifying an impedance of a rectifier to modulate the received carrier signal by providing a potential to at least one node of the rectifier based on a field strength of the received carrier signal and a modulation-control signal.

10. The apparatus of claim 9, further comprising means for providing a voltage based on the field strength of the received carrier signal.

11. The apparatus of claim 10, further comprising means for controlling the providing of the potential to the at least one node of the rectifier based on the modulation-control signal and the voltage based on the field strength of the received carrier signal.

12. The apparatus of claim 10, further comprising means for providing a signal when the voltage based on the field strength of the received carrier signal is higher than a reference voltage.

13. The apparatus of claim 9, wherein the potential provided to the at least one node of the rectifier is a reference potential.

14. The apparatus of claim 9, wherein providing the potential to at least one node of the rectifier comprises providing the potential to a high-frequency node of the rectifier for performing phase modulation of the received carrier signal.

15. The apparatus of claim 9, wherein providing the potential to at least one node of the rectifier comprises performing amplitude modulation of the received carrier signal by providing the potential to a low-frequency node of the rectifier.

16. The apparatus of claim 1, wherein the at least one node of the rectifier is a low-frequency node, such that providing the potential to the low-frequency node performs phase modulation of the received carrier signal.

17. A method comprising:
receiving a carrier signal from a base station;
modulating the received carrier signal; and
modifying an impedance of a rectifier to modulate the received carrier signal by providing a potential to at least one node of the rectifier based on a field strength of the received carrier signal and a modulation-control signal.

18. The method of claim 17, wherein the potential provided to the at least one node of the rectifier is a reference potential.

19. The method of claim 17, further comprising providing a voltage based on the field strength of the received carrier signal.

20. The method of claim 19, further comprising controlling the providing of the potential to the at least one node of the rectifier based on the modulation-control signal and the voltage based on the field strength of the received carrier signal.

21. The method of claim 19, further comprising-providing a signal when the voltage based on the field strength of the received carrier signal is higher than a reference voltage.

22. The method of claim 17, wherein providing the potential to at least one node of the rectifier comprises providing the potential to a high-frequency node of the rectifier for performing phase modulation of the received carrier signal.

23. The method of claim 17, wherein providing the potential to at least one node of the rectifier comprises providing the potential to a low-frequency node of the rectifier for performing amplitude modulation of the received carrier signal.

* * * * *

UNITED STATES PATENT AND TRADEMARK OFFICE
CERTIFICATE OF CORRECTION

| | | |
|---|---|---|
| PATENT NO. | : 8,274,370 B2 | Page 1 of 1 |
| APPLICATION NO. | : 11/652563 | |
| DATED | : September 25, 2012 | |
| INVENTOR(S) | : Ulrich Friedrich et al. | |

It is certified that error appears in the above-identified patent and that said Letters Patent is hereby corrected as shown below:

In the Claims

Col. 10, Ln. 42: After "switch" and before "the" insert --and--.

Col. 10, Ln. 59: After "The" and before "of claim 1" insert --apparatus--.

Signed and Sealed this
Twenty-fourth Day of March, 2015

Michelle K. Lee
*Director of the United States Patent and Trademark Office*